(12) United States Patent
Goodwin

(10) Patent No.: US 10,183,686 B2
(45) Date of Patent: Jan. 22, 2019

(54) MOBILE GAS CONTAINER CART

(71) Applicant: Chad Goodwin, Loa, UT (US)

(72) Inventor: Chad Goodwin, Loa, UT (US)

( * ) Notice: Subject to any disclaimer, the term of this patent is extended or adjusted under 35 U.S.C. 154(b) by 0 days.

(21) Appl. No.: 15/703,065

(22) Filed: Sep. 13, 2017

(65) Prior Publication Data
US 2018/0072335 A1    Mar. 15, 2018

Related U.S. Application Data

(60) Provisional application No. 62/394,107, filed on Sep. 13, 2016.

(51) Int. Cl.
| | | |
|---|---|---|
| *B62B 1/00* | | (2006.01) |
| *B62B 3/10* | | (2006.01) |
| *B62B 3/04* | | (2006.01) |
| *B62B 3/12* | | (2006.01) |

(52) U.S. Cl.
CPC ............ *B62B 3/10* (2013.01); *B62B 3/04* (2013.01); *B62B 3/12* (2013.01)

(58) Field of Classification Search
CPC .... B62B 3/12; B62B 3/10; B62B 3/04; B62B 3/02; B62B 3/104; B62B 3/00; B62B 3/08; B62B 2202/022; B62B 2203/42; B62B 2203/40; B62B 2206/06
See application file for complete search history.

(56) References Cited

U.S. PATENT DOCUMENTS

| | | | | |
|---|---|---|---|---|
| 2,472,670 A | * | 6/1949 | McFarland | B62B 1/264 |
| | | | | 280/47.18 |
| 4,544,173 A | | 10/1985 | Kellermyer | |
| 5,658,118 A | * | 8/1997 | Luca | B62B 1/264 |
| | | | | 280/47.2 |
| 6,059,127 A | * | 5/2000 | Bennett | B62B 3/02 |
| | | | | 211/85.18 |
| 6,224,071 B1 | | 5/2001 | Dummer | |
| 6,293,273 B1 | | 9/2001 | Byrne et al. | |
| 6,334,622 B1 | * | 1/2002 | Romero | B62B 1/14 |
| | | | | 280/47.26 |
| 7,114,732 B1 | * | 10/2006 | Ismail | B23K 9/32 |
| | | | | 280/47.34 |
| 7,201,383 B2 | * | 4/2007 | Gibby | B62B 1/125 |
| | | | | 220/622 |
| 7,325,814 B2 | | 2/2008 | Sparacino | |
| 7,438,084 B2 | * | 10/2008 | Trettin | B25H 3/00 |
| | | | | 137/355.16 |
| 8,167,322 B2 | * | 5/2012 | Greene | B62B 3/104 |
| | | | | 280/47.24 |
| 8,262,108 B2 | | 9/2012 | Al-Hasan | |
| 8,967,634 B2 | * | 3/2015 | Barnes | B62B 1/142 |
| | | | | 280/43.11 |
| 9,150,234 B2 | * | 10/2015 | Beaver | B62B 3/10 |
| 9,573,608 B2 | * | 2/2017 | Glass | B62B 1/14 |
| 9,751,161 B2 | * | 9/2017 | Stewart | B23K 37/0294 |

(Continued)

*Primary Examiner* — James M Dolak
(74) *Attorney, Agent, or Firm* — Arent Fox LLP

(57) ABSTRACT

A mobile gas container cart, having a base configured to receive a gas container. The mobile gas container cart includes a set of wheels coupled to the base, each wheel of the set of wheels having a diameter of at least twelve inches. The cart includes a handle extending from the base and an extension extending from the base in a direction opposite the handle. A third wheel may be positioned at an end of the extension.

20 Claims, 19 Drawing Sheets

(56) References Cited

U.S. PATENT DOCUMENTS

| | | | |
|---|---|---|---|
| 9,885,479 B2 * | 2/2018 | Glass | B62B 1/14 |
| 9,937,942 B2 * | 4/2018 | Nussbaum | B62B 3/02 |
| 9,963,158 B2 * | 5/2018 | Biesinger | B62B 1/125 |
| 10,011,291 B2 * | 7/2018 | Johnson | B62B 3/008 |
| 10,040,467 B2 * | 8/2018 | Restall | B62B 3/00 |
| 10,053,126 B2 * | 8/2018 | Buttimer | B62B 3/08 |

* cited by examiner

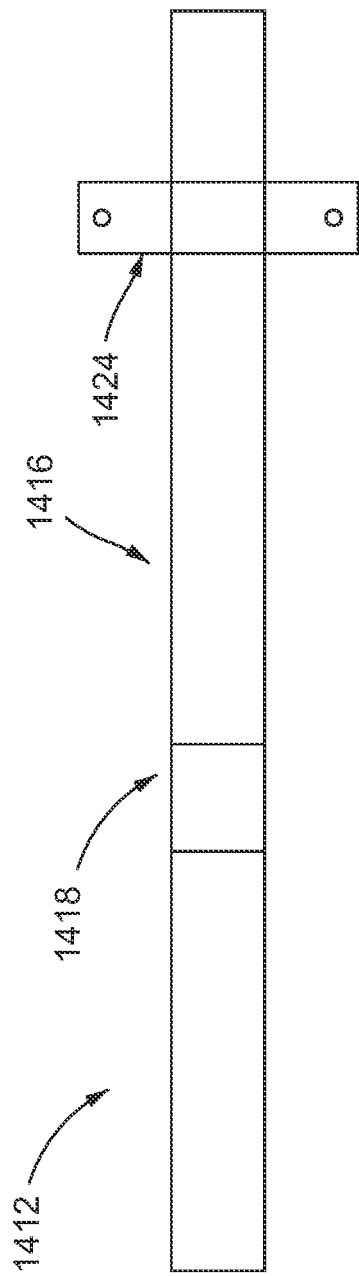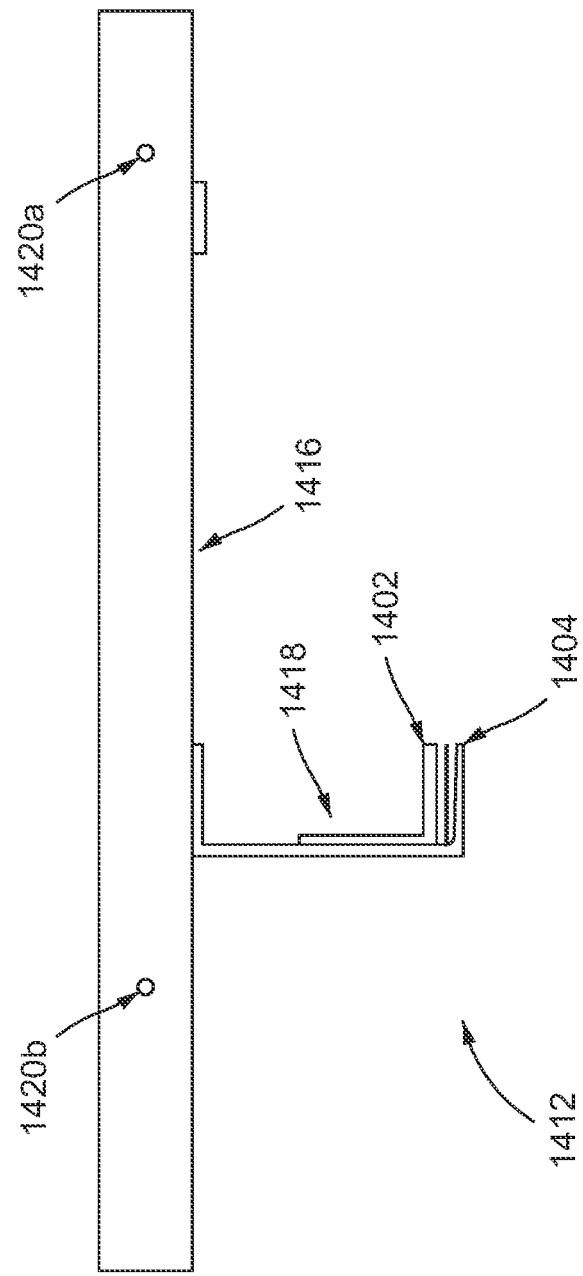

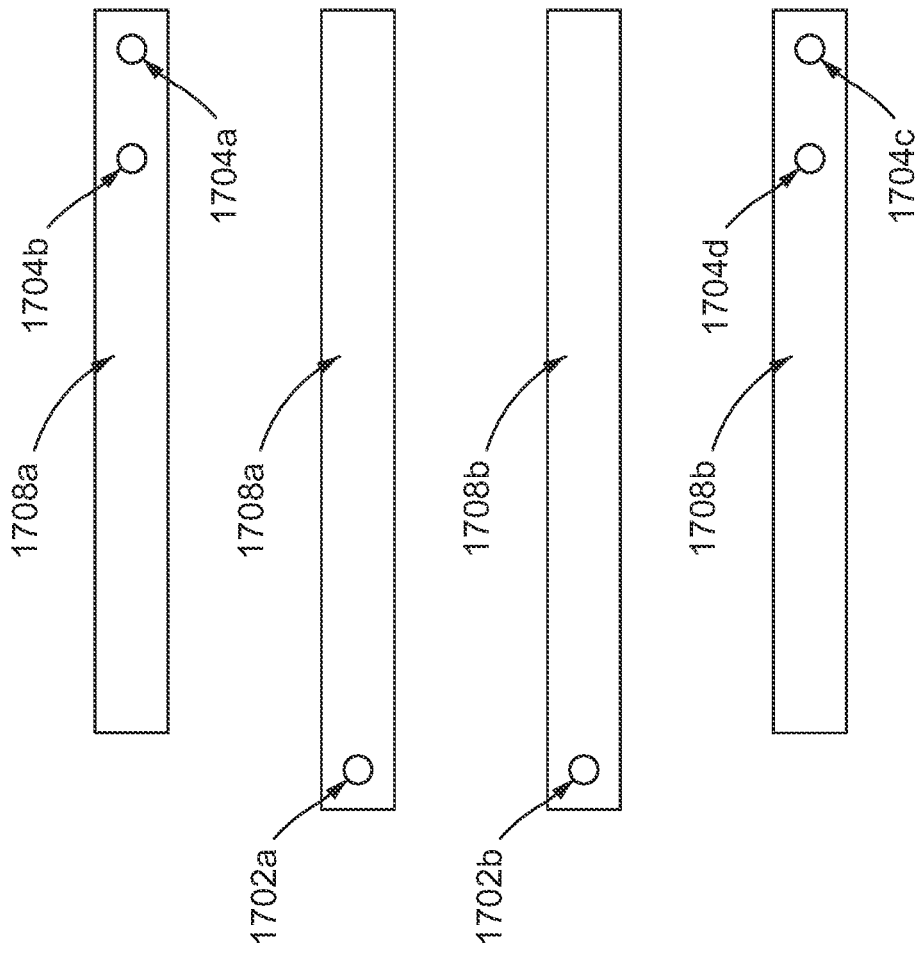

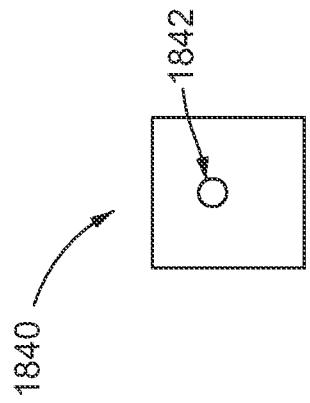
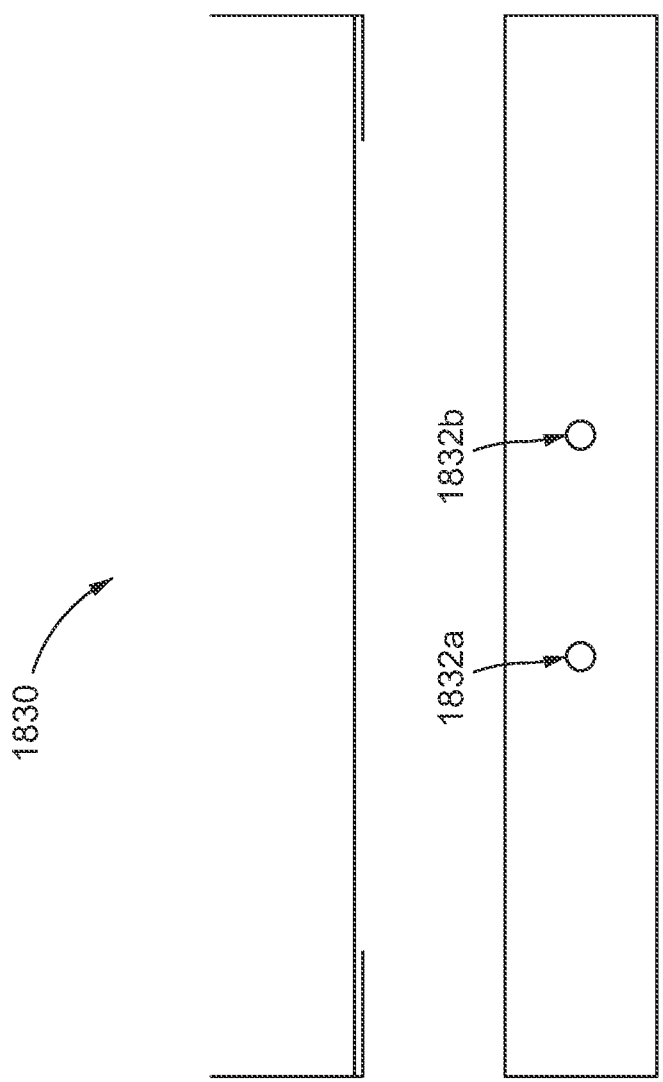

MOBILE GAS CONTAINER CART

CROSS-REFERENCE TO RELATED APPLICATION

This application claims the benefit of U.S. Provisional Application Ser. No. 62/394,107, entitled "Mobile Gas Container Cart" and filed on Sep. 13, 2016, which is expressly incorporated by reference herein in its entirety.

BACKGROUND

Field

Aspects of the present disclosure relate generally to a portable gas tank, for example, to a wheeled cart for gas containers.

Description of the Related Art

Gas containers, such as gas cylinders, are used in various applications. For example, gas cylinders may be used in medical applications, agricultural work, construction projects, etc.

Such tanks may be used in applications that require the tank to be mobile. Current carts are unstable and awkward when attempting to move the cart over anything other than a flat surface, whereas many applications may need a gas cylinder to be moved across uneven terrain.

Therefore, there is a need for a way to transport gas containers, especially over different types of terrain.

SUMMARY

In light of the above described problems and unmet needs, the present disclosure provides a mobile gas container cart, e.g., also referred to herein as a gas tank cart. Aspects described herein provide a cart that is capable of moving a gas tank in a stable and secure manner, even across rough terrain. The cart increases ease of use by a person operating the cart, making it easier to maneuver the cart and to operate accessories attached to the gas tank. Additionally, the cart is configured to provide a stable base that supports the gas tank in a secure manner when motion is paused.

In an aspect of the disclosure, a gas container is provided that moves a center of gravity of the tank, or gas container, lower relative to a set of wheels between which the tank is positioned. Aspects may include a mobile gas container cart, comprising a base configured to receive a gas container; a set of wheels coupled to the base, each wheel of the set of wheels having a diameter of at least twelve inches; a handle extending from the base; an extension extending from the base in a direction opposite the handle; and a third wheel positioned at an end of the extension.

The base may be positioned relative to the set of wheels such that a center of gravity of a gas container received on the base is at a level with the set of wheels.

The base may comprise a gas container securing mechanism with an extension configured to extend upward against a bottom of the gas container. The extension may include at least one semicircular component extending from the base and configured to fit to a circular indentation on the bottom of the gas container.

The cart may further include a holding mechanism that is adjustable to hold gas containers of different heights to the cart. The holding mechanism may extend from the handle to hold gas containers at a plurality of heights on the handle. The holding mechanism may include a slide that surrounds the handle and can be fixed at various heights to the handle. The holding mechanism may include a rounded piece configured to movably slide within a portion of a handle of the gas container. The holding mechanism may include a u-shaped extension configured such to fit around a portion of a handle of the gas container.

The cart may further include an accessory holder coupled to the base.

For example, Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

Various example aspects of the systems and methods will be described in detail, with reference to the following figures, wherein:

FIGS. 14A and 14B illustrate example aspects of a tank holding mechanism of a cart, in accordance with aspects of the present invention.

FIGS. 17A, 17B, 17C, and 17D illustrate example aspects of a base and front extension piece of a cart, in accordance with aspects of the present invention.

FIGS. 18A, and 18B illustrate aspects of example base components of a cart, in accordance with aspects of the present invention.

DETAILED DESCRIPTION

These and other features and advantages are described in, or are apparent from, the following detailed description of various example aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of gas container cart will now be presented with reference to various apparatus and methods. The example aspects of such an apparatus will be described in the following detailed description and illustrated in the accompanying drawings.

Figure 1:
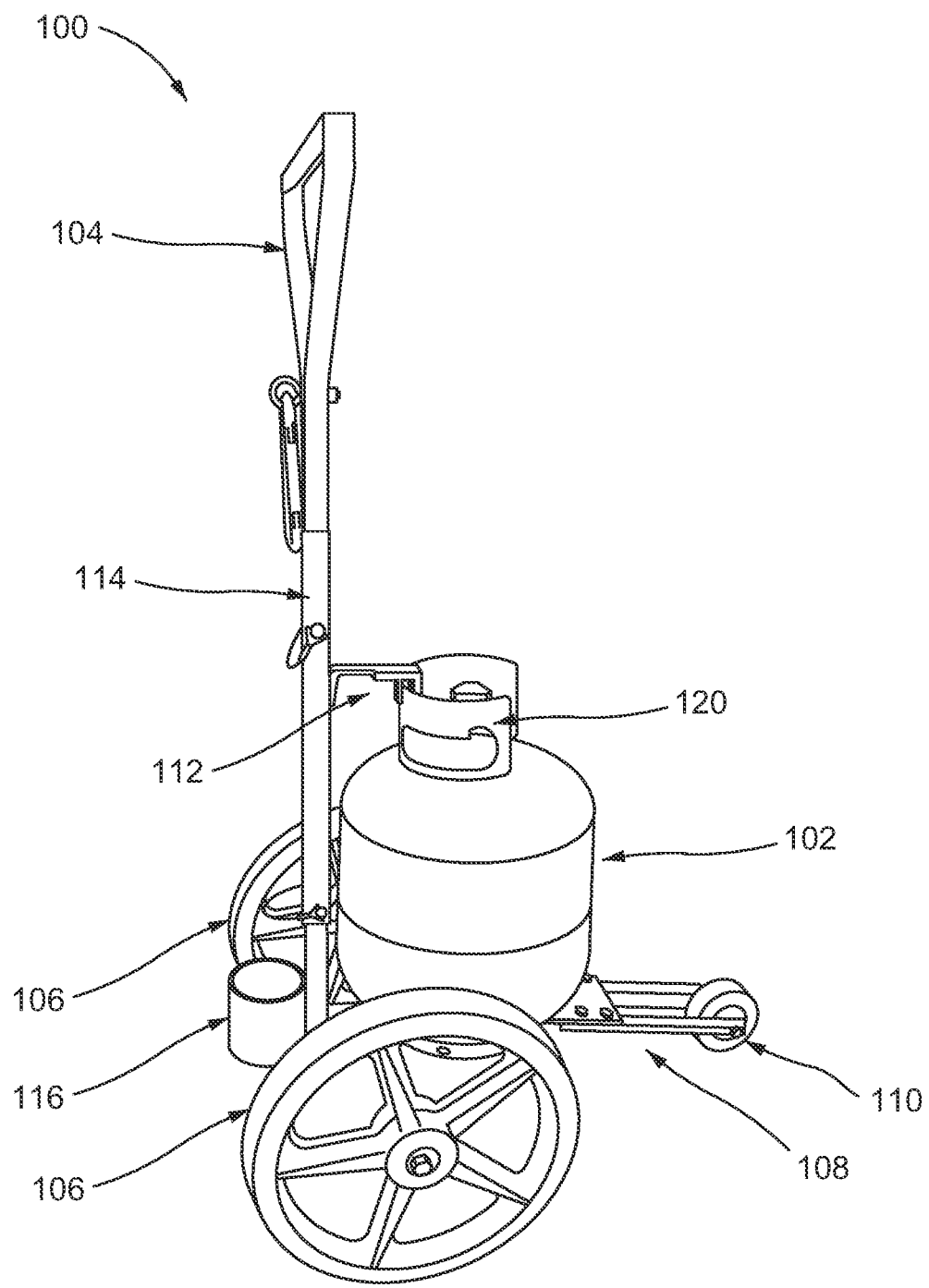
FIG. 1 illustrates a side view of an example cart, in accordance with aspects of the present invention.

FIG. 1 is a picture illustrating an example cart 100 for receiving and transporting a gas container 102 in a stable manner. In FIG. 1, the cart includes a base, visible in FIGS. 2-5, a handle 114 extending upward from the base, and a set of wheels 106 positioned on opposite sides of the base from each other. An end of the handle 114 may be configured for a user to grip, e.g., handle end 104.

The diameter of the set of wheels and the position of the base may be selected relative to the set of wheels such that a center of gravity of a gas container received on the base is at a level with the set of wheels. For example, for carts configured to transport larger gas containers, larger wheels may be used. The cart may be configured to receive tanks of different heights. Therefore, the cart may be configured such that at least one of the tanks has a center of gravity at a level below the top of the wheels.

The cart 100 may further include an extension 108 extending from the base and coupled to a third wheel 110. The extension 108 may extend from a section of the base 202 opposite the set of wheels. The extension 108 may be configured so that the cart 100 rests with the weight of the gas container pressing the third wheel against the ground unless a user pushes the handle toward the ground. The user may push on the handle to lift the third wheel off of the ground in order to pull the cart using the larger set of wheels.

The extension and third wheel enable the cart to rest in a position with the gas container flat relative to the ground. As the extension piece includes the third wheel, the cart may also be able to move when the third wheel is in contact with the ground. Therefore, the third wheel adds stability and yet enables the cart to continue to roll so as to be readily positioned on a relatively flat surface. The third wheel enables the cart to be pivoted and pushed forward. In one example, the extension may be flat rather than angled. The wheel provides the ability to pivot the cart. The third wheel may have a smaller diameter than the set of wheels. The sizes of the wheels may be selected so that a ratio of a diameter of the sets of wheels to a diameter of the third wheel is within a range of between 16:2 to 12:6, e.g., in one example approximately 7:2. For example, in the example cart of FIGS. 1-4, the larger set of wheels have a diameter of between 12-16 inches, e.g., 14 inches, and a width of approximately 1-3 inches, e.g., 1.75 inches. The smaller, third wheel may have a diameter of 2-6 inches, e.g., 4 inches.

The cart 100 may further comprise at least one component that holds the gas container 102 relative to the cart. For example, in FIG. 1, the cart 100 includes a tank holding mechanism 112, also referred to herein as a gas container holding mechanism, that holds the gas container 102 in a fixed position relative to the base and handle.

Figure 2:
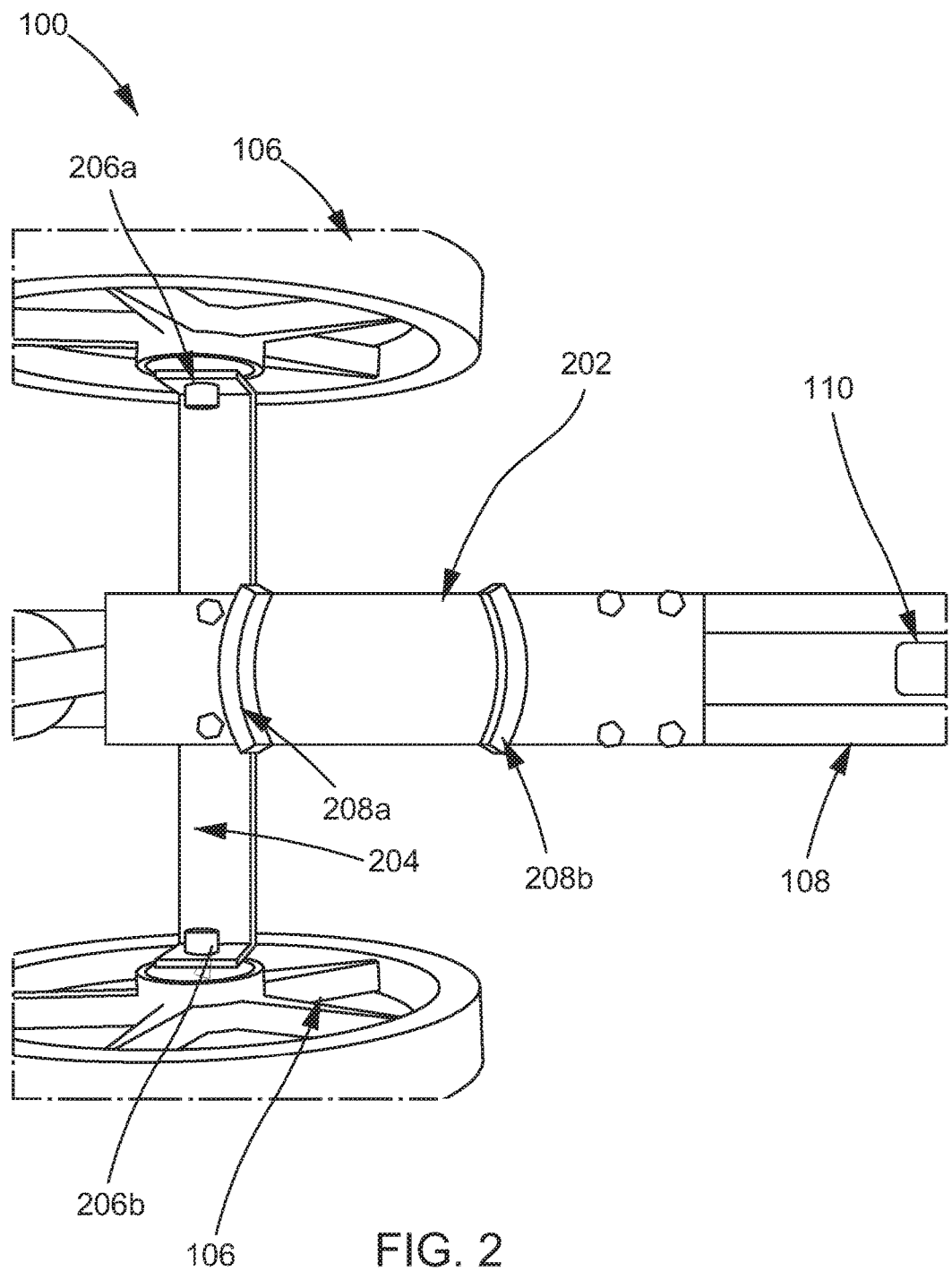
FIG. 2 illustrates a view of a base of an example cart, in accordance with aspects of the present invention.

FIG. 2 illustrates a view of the cart 100 from a perspective above the cart 100 with the gas container 102 from FIG. 1 removed. Base 202 forms a platform on which the gas container is placed and then held in a fixed position on the cart. The base may comprise a metal sheet, a hard plastic sheet, a mesh, a grate, etc. that forms a suitably flat and hard surface for receiving the tank and for providing a base and support for the other components of the cart.

Various dimensions may be used for the base 202. In the example in FIG. 2, the base has a width approximately the same as the extension 108. However, in other examples the width of the base 202 may be wider than the extension 108. FIG. 2 illustrates an axle 204 rotatably coupled between the set of wheels 108, e.g., at connections 206a, 206b. In FIG. 2, the base 202 has a width less than half that of the axle 204. The base 202 may have a width of approximately one third of the width of the axle 204, or even less than one third of the width of the axle 204. In other examples, the width may be larger. The width may be selected to provide stability and mobility based on the diameter of the gas tank.

The base may comprise a gas container securing mechanism for receiving and helping to hold the gas container in a relatively fixed position relative to the base 202. The securing mechanism may be shaped corresponding to the gas container in order to receive the gas container. In one example, the securing mechanism may be shaped to surround at least a portion of the gas container. In another example, the securing mechanism may be shaped so as to extend upward into a recessed portion of a bottom of a gas container. The securing mechanism may be shaped to fit to at least a portion of the bottom of a gas container.

In the example illustrated in FIG. 2, the securing mechanism comprises an extension 208a, 208b configured to extend upward within a bottom portion of a gas container. The securing mechanism may be shaped to fit to at least a portion of the bottom of a gas container reducing movement of the gas container relative to the base and enabling the gas container to be held to the cart in a more secure manner.

In FIG. 2, the extension comprises semicircular components 208a, 208b that are configured to fit within a circular indentation on the bottom of a gas container. The extension may form a full circle, or may form only a portion of a circle, as in FIG. 2. Although two extensions 208a, 208b are illustrated, a single, semi-circular extension may also be used. Although a circular extension is illustrated, an angular extension may also be used in other examples, e.g., a triangular or square extension. Such an angular extension may be configured to fit within the indentation on the bottom of the gas container and to make contact with portions of the indentation.

FIG. 2 illustrates the extension pieces 108 being coupled to the base 202 with bolts and the base 202. In other examples, the extension pieces 108 may be coupled to the base in a fixed manner, e.g., via welding, by having the extension and the base formed from a unitary structure, etc. In another example, the extension 108 may be coupled to the base 202 in a releasable manner so that the extension piece can be removed for shipment, storage, etc. In another example, the extension 108 may be rotatably coupled to the 202 so that the extension can rotate toward the base enabling the extension to fold in toward the base. Whether the extension is releasably or rotatably coupled to the base, such motion/release enables the cart to fold or collapse into a more compact configuration when not in use with a gas container.

Figure 3:
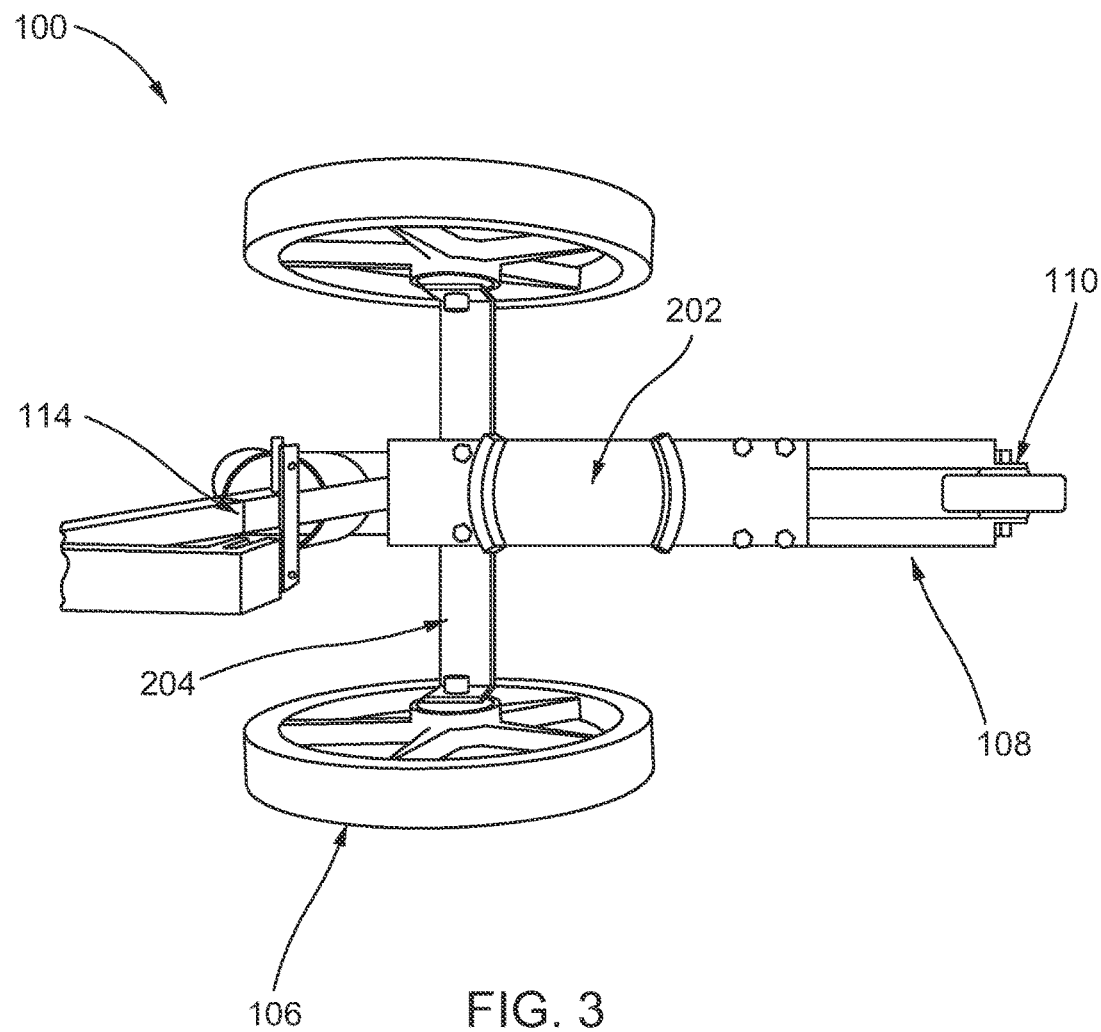
FIG. 3 illustrates a view of a base of an example cart, in accordance with aspects of the present invention.

FIG. 3 illustrates a perspective of cart 100 similar to FIG. 2, but from a greater height, and illustrates vertical extension/handle 114 extending upward from base 202.

Figure 4:
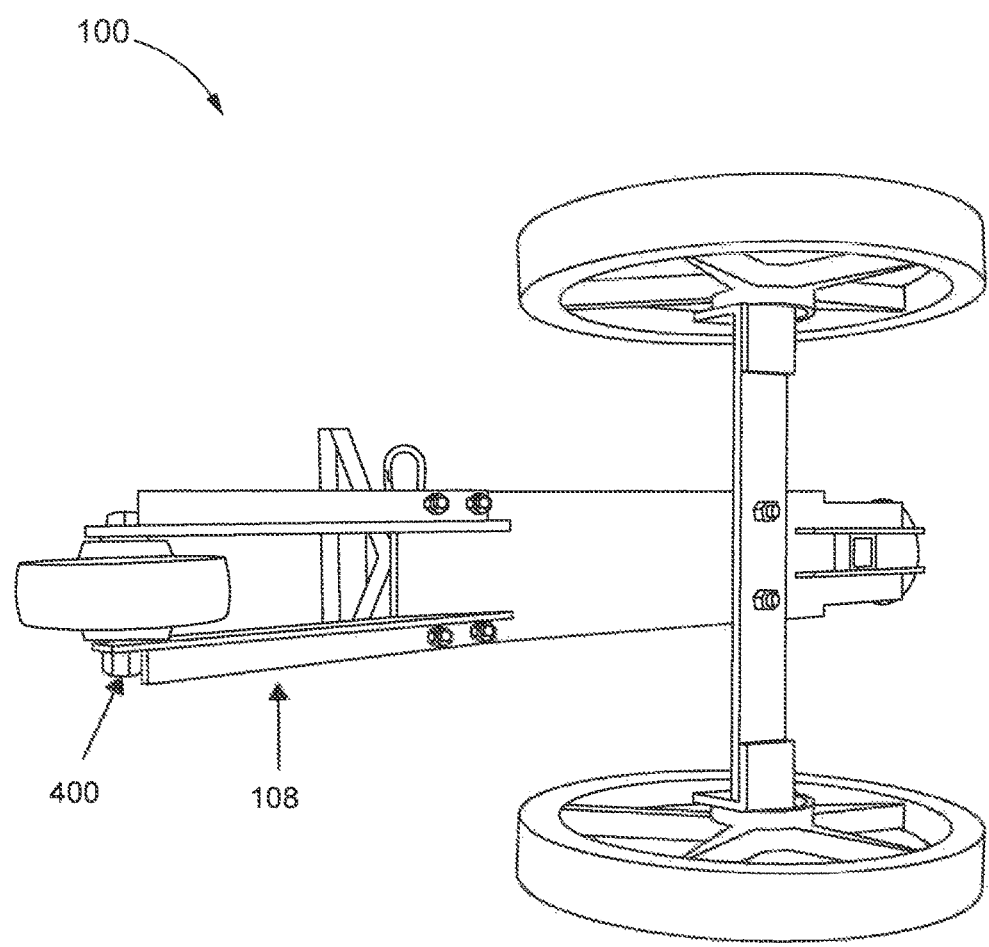
FIG. 4 illustrates a bottom view of an example cart, in accordance with aspects of the present invention.

FIG. 4 illustrates a bottom perspective of the cart 100.

Figure 5:
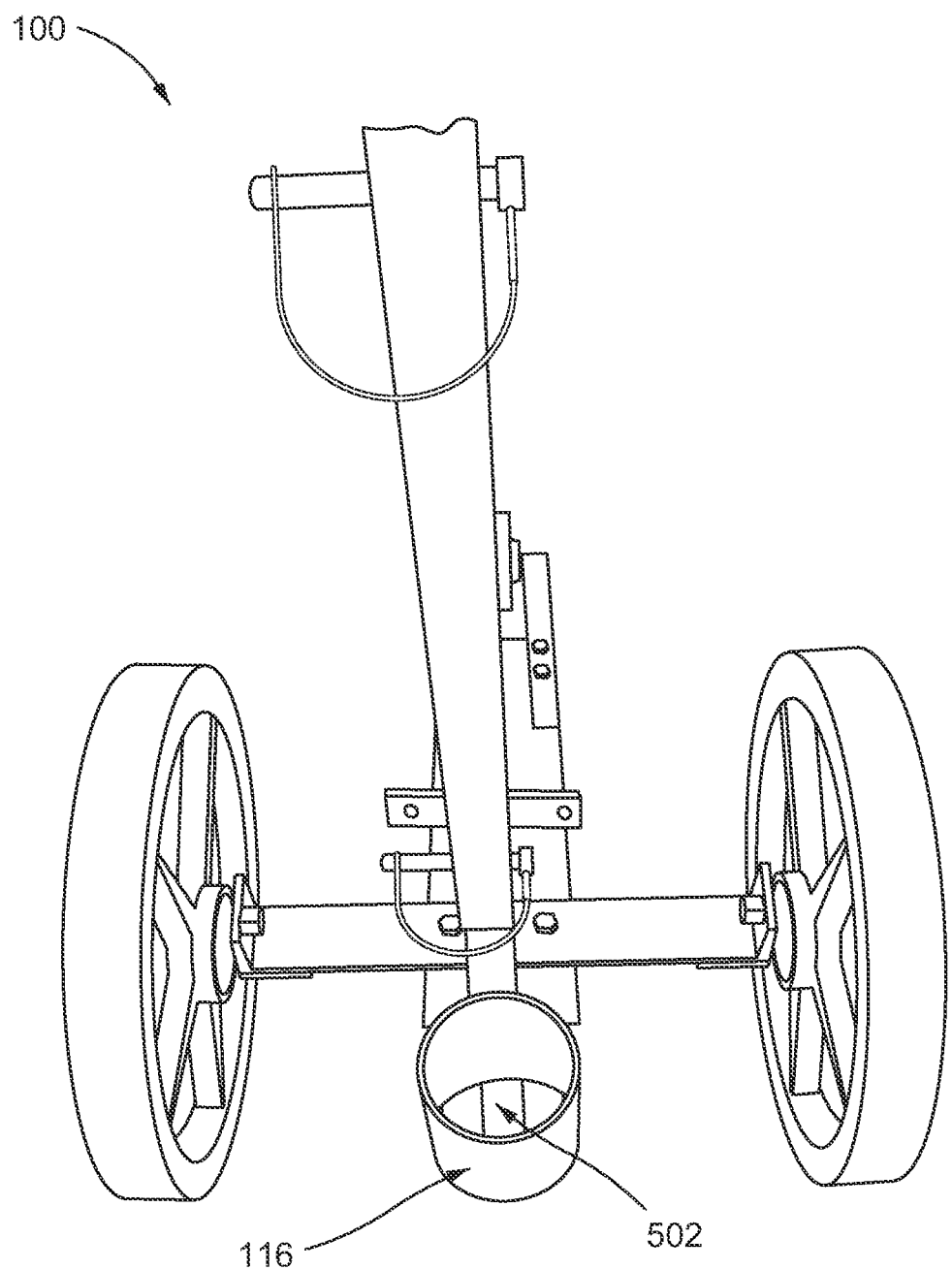
FIG. 5 illustrates a rear view of an example cart, in accordance with aspects of the present invention.
Figure 19:
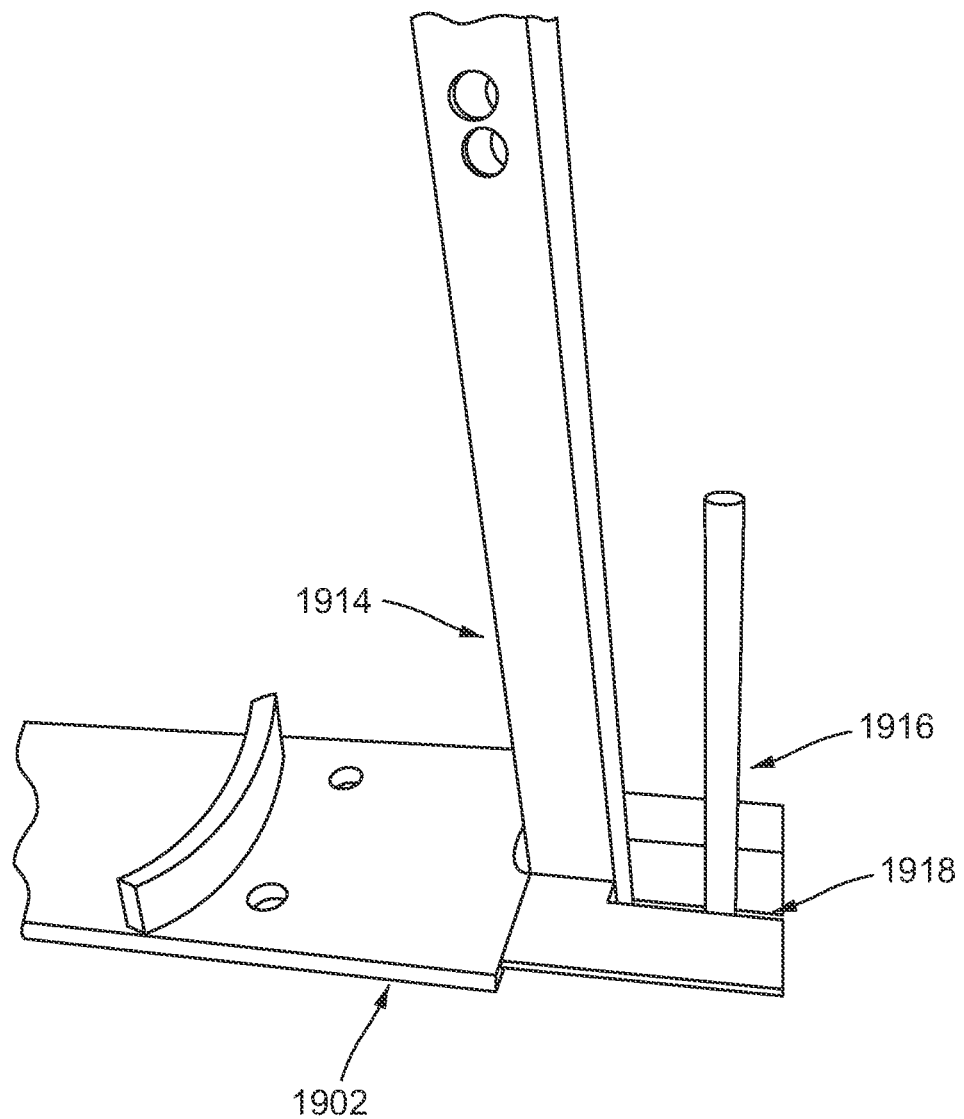
FIG. 19 illustrates example aspects of a base and accessory holder of a cart, in accordance with aspects of the present invention.

FIG. 5 illustrates a view of the cart from a side opposite the extension 108 and third wheel. The cart 100 in FIG. 5 includes an accessory holder 116. As in the example in FIG. 5, the accessory holder 116 may comprise a cylindrical, cup-shaped component. In another example, illustrated in FIG. 19, the accessory holder 1916 may comprise a rod extending upward from 1902 parallel to the vertical extension/handle 1914. For example, FIG. 19 illustrates a 5/16 inch rod extending 6 inches high parallel to the vertical extension/handle 1914 extending upward from the base 1902. For example, the rod may be configured to extend into a portion of an accessory to hold the accessory in a position relative to the cart. In the example of a torch, one end of the torch may be placed over the rod in order to store the torch at the cart. The accessory holder 116 may be shaped to receive, or to be received into, a particular accessory for a gas container, or may be sized to receive, or to be received into, a variety of accessories that may be used with the gas container. At least a portion 502 of the bottom of the accessory holder 116 may be open. This open portion 502 enables residue, dirt, or fluid to exit the bottom of the accessory holder 116 rather than collecting as undesirable build-up. Additionally, the open portion may be sized to receive at least a portion of an accessory. Similarly, FIG. 19 illustrates the rod shaped accessory holder 1916 positioned near an opening 1918 in the base.

Figure 6:
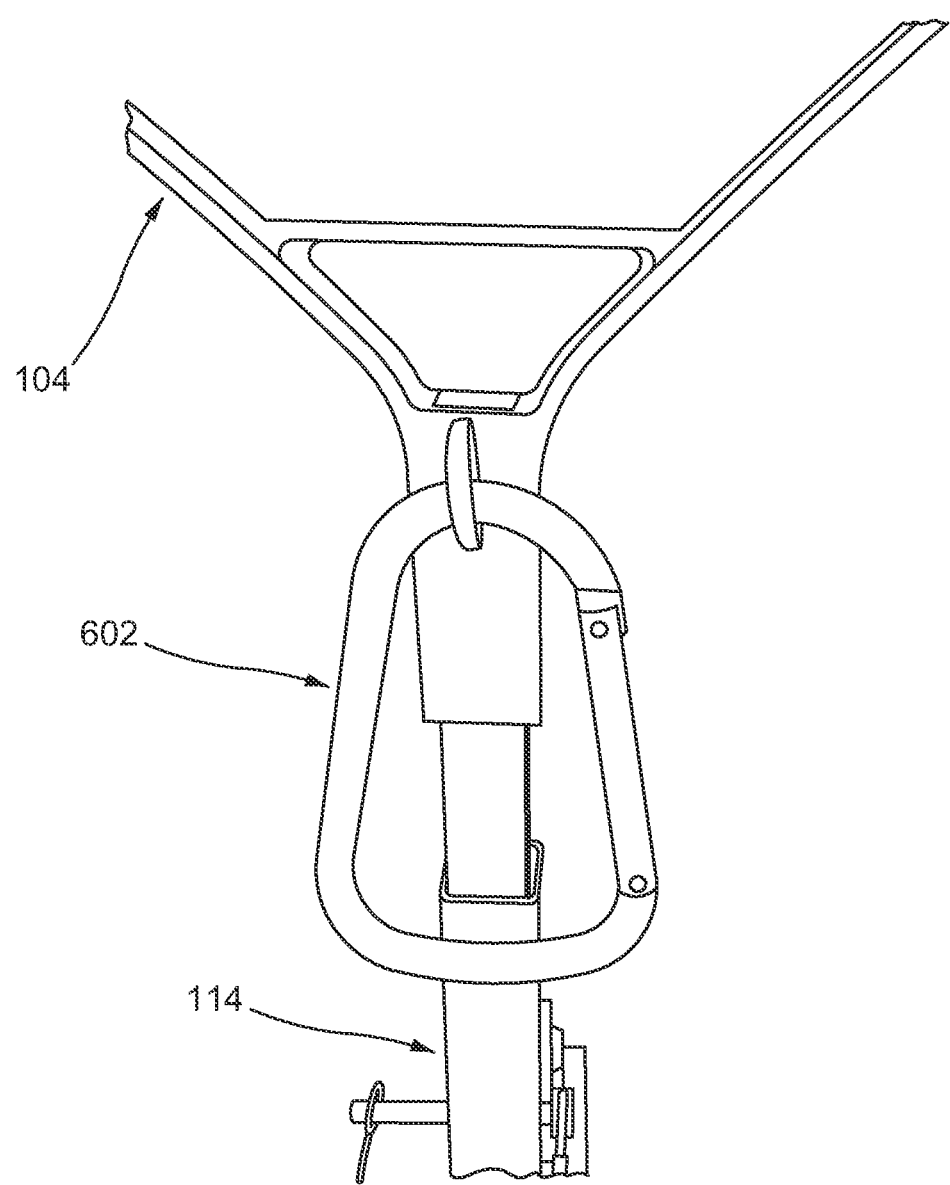
FIG. 6 illustrates aspects of an accessory holder of an example cart, in accordance with aspects of the present invention.

A bulky accessory holder, and therefore cart, may be undesirable. In order to maintain a reduced size of the cart while still holding an accessory in a relatively fixed position relative to the cart, an accessory attachment piece may be comprised at a position on the handle 104 or vertical extension 114. For large accessories, such as a torch, the accessory attachment piece may hold an upper portion of the accessory in a position relative to the cart, while the accessory holder 116 receives a second portion of the accessory. The accessory attachment piece may comprise a loop, hook, or similar component into which the portion of the accessory can be inserted and help. The attachment piece may comprise a latch that holds the portions of the accessory. FIG. 6 illustrates one example accessory attachment piece 602 for the cart 100 having a latch. In FIG. 6, an eyelet bolt extends from handle 114 and a carabiner type attachment piece is positioned within the eyelet bolt. The carabiner comprises a gate that opens to receive a portion of the accessory, such as a hose, and is biased to close automatically when released. An eyelet bolt and carabiner is only one example of a latching or hooking mechanism that can be used to hold an upper portion of an accessory.

In other examples, the accessory attachment piece may be formed as an integral portion of the handle, e.g., such as a hooked protrusion from the handle. An elastic band portion may be provided to hold a portion of the accessory. In other examples, a Velcro strap, a plastic strap, a fabric strap, etc. may be used.

Figure 7:
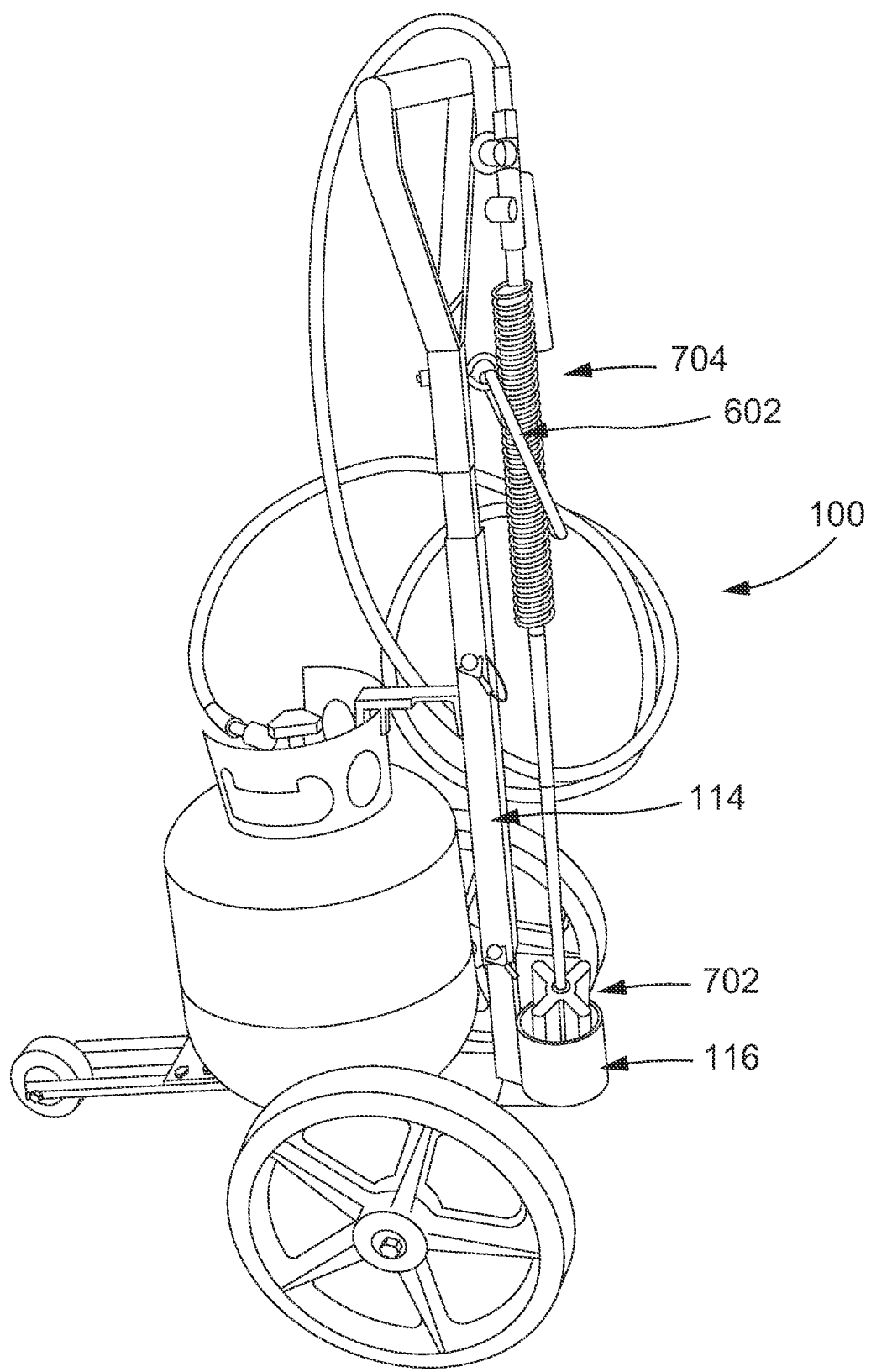
FIG. 7 illustrates a side view of an example cart and tank, in accordance with aspects of the present invention.

FIG. 7 illustrates the cart 100 having an example accessory held within accessory holder 116 and accessory connection piece 602. In this example, the accessory is a torch with a first end 702 placed in accessory holder 116 and a second portion 704 held with connection piece 602. For a torch, the second portion held by the connection piece 602 may comprise a handle, a section of hose, etc. The cart, including the accessory holder and accessory attachment piece, allows the torch to be transported along with the gas container with ease. Although this example is described for a torch, the accessory holder 116 and/or the accessory connection piece 602 may be configured to receive or hold other accessories, including among others, a sprayer.

Figure 8:
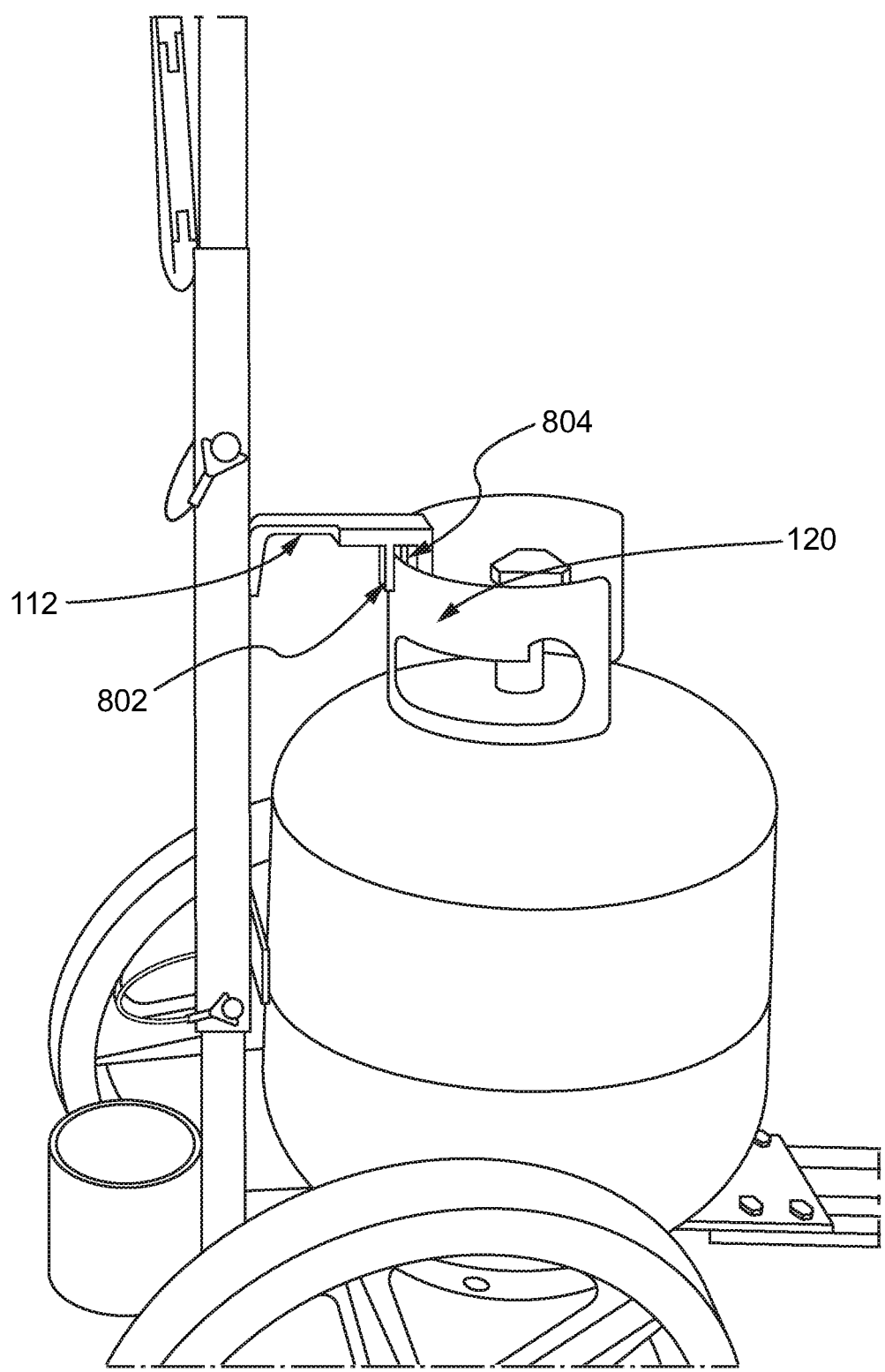
FIG. 8 illustrates a view of an example cart holding a tank, in accordance with aspects of the present invention.

The cart may further include a tank holding mechanism that is configured to hold the tank in a fixed position relative to the cart. The tank holding mechanism may be provided in combination with the securing mechanism, e.g., 208, in order to hold the tank securely even when moved across uneven terrain. FIG. 1 illustrates an example tank holding mechanism 112 that extends from the handle and has a U-shaped portion that the two sides of the U-shaped portion extend on opposites sides of the handle 120 of the gas tank 102. The middle portion of the U-shaped mechanism holds the gas tank handle and prevents up and down movement of the gas tank relative to the base. As the securing mechanism 208 may prevent forward and backward movement relative to the cart, the use of the securing mechanism 208 and the tank holding mechanism 112 together with the securing mechanism 208 may hold the tank in a fixed position relative to the cart. Other tank holding mechanisms may be employed. For example, a strap may be provided that holds the tank to the handle. FIG. 8 illustrates a closer view of U-shaped tank holding mechanism 112, showing a first extension 802 of the U-shaped component 112 positioned on a first side of handle 120 and a second extension 804 positioned on the opposite side of the handle 120.

Figure 9:
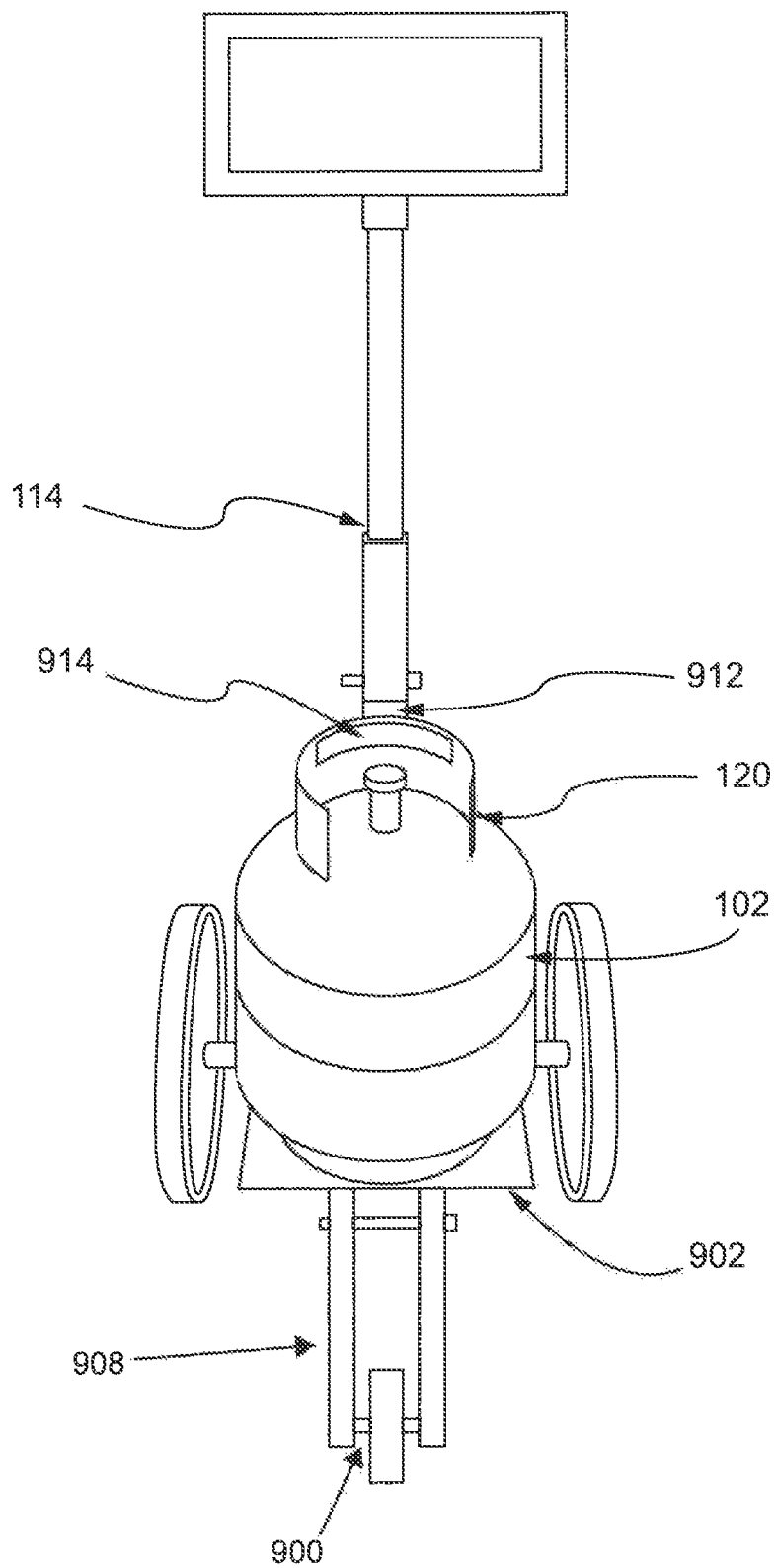
FIG. 9 illustrates a front view of an example cart holding a tank, in accordance with aspects of the present invention.
Figure 10:
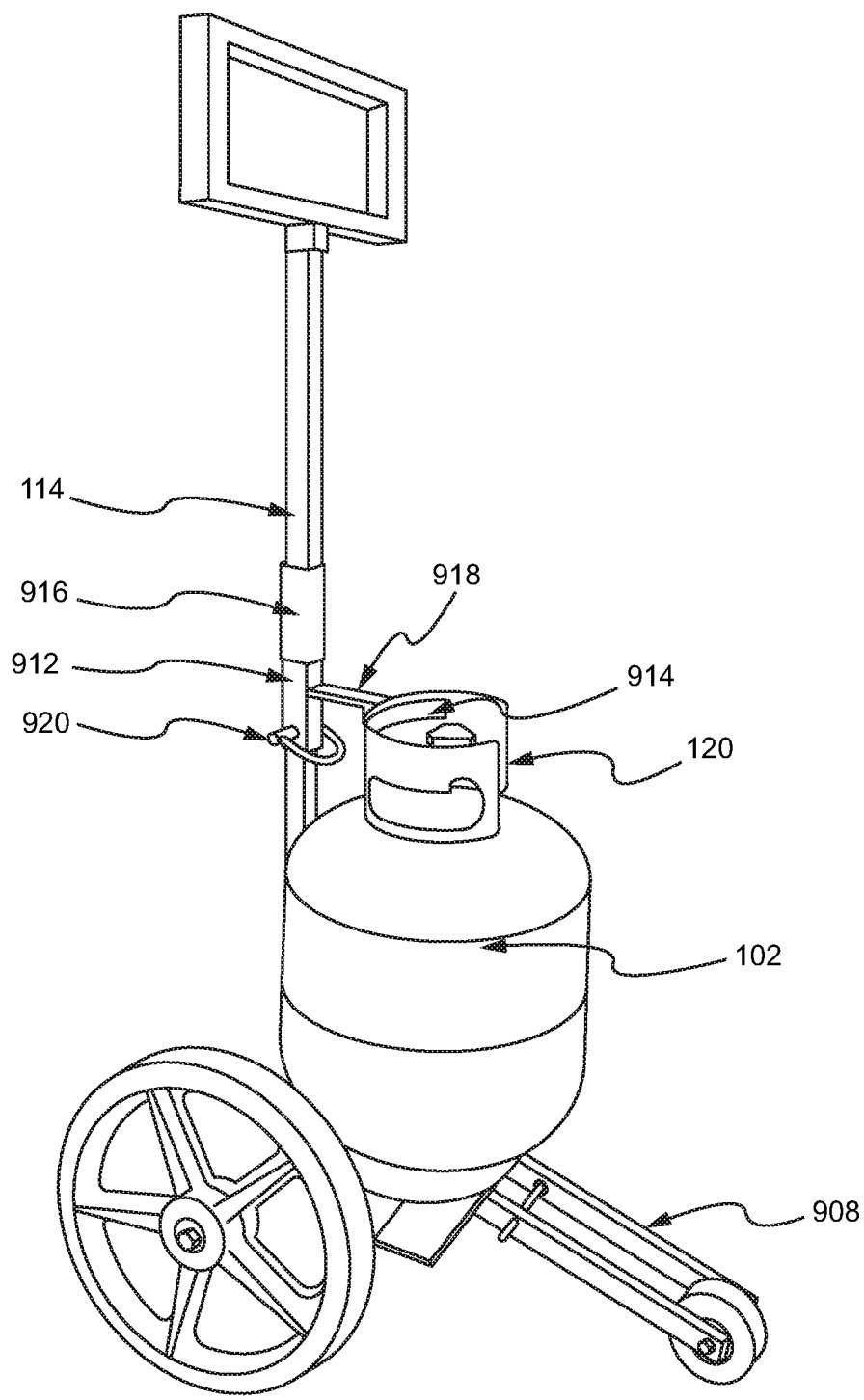
FIG. 10 illustrates a view of an example cart holding a tank, in accordance with aspects of the present invention.

FIG. 9 illustrates another example of a tank holding mechanism 912 that comprises a rounded piece 914 configured to movably slide within handle 120 of the gas container 102. FIG. 10 illustrates a side view of the cart in FIG. 9. FIG. 9 also illustrates a number of example aspects. For example, the base 902 in FIG. 9 is wider than the base 202 in FIG. 2. Additionally, the hand grip at the handle is shaped differently than that in FIG. 1.

As illustrated in FIGS. 9 and 10, the tank holding mechanism 912 may be adjustable so that it can be used to secure tanks 102 of different heights. For example, the tank holding mechanism 912 may comprise a moveable portion 916 that slides or otherwise moves relative to handle 114. For example, the movable portion 916 may surround at least a portion of handle 114 and may slide relative to the handle 114 so that the tank holding mechanism can be raised and lowered during tank placement. Extension 918 extends from the moveable portion 916 and ends with rounded piece 914. The tank holding portion may latch to handle at different heights. For example, in FIG. 10, the tank holding portion 912 comprises an opening to receive a pin 920. The handle 114 may comprise a similarly shaped opening at a number of heights, allowing the tank holding portion to be secured at any of the number of heights using pin 920.

Figure 11:
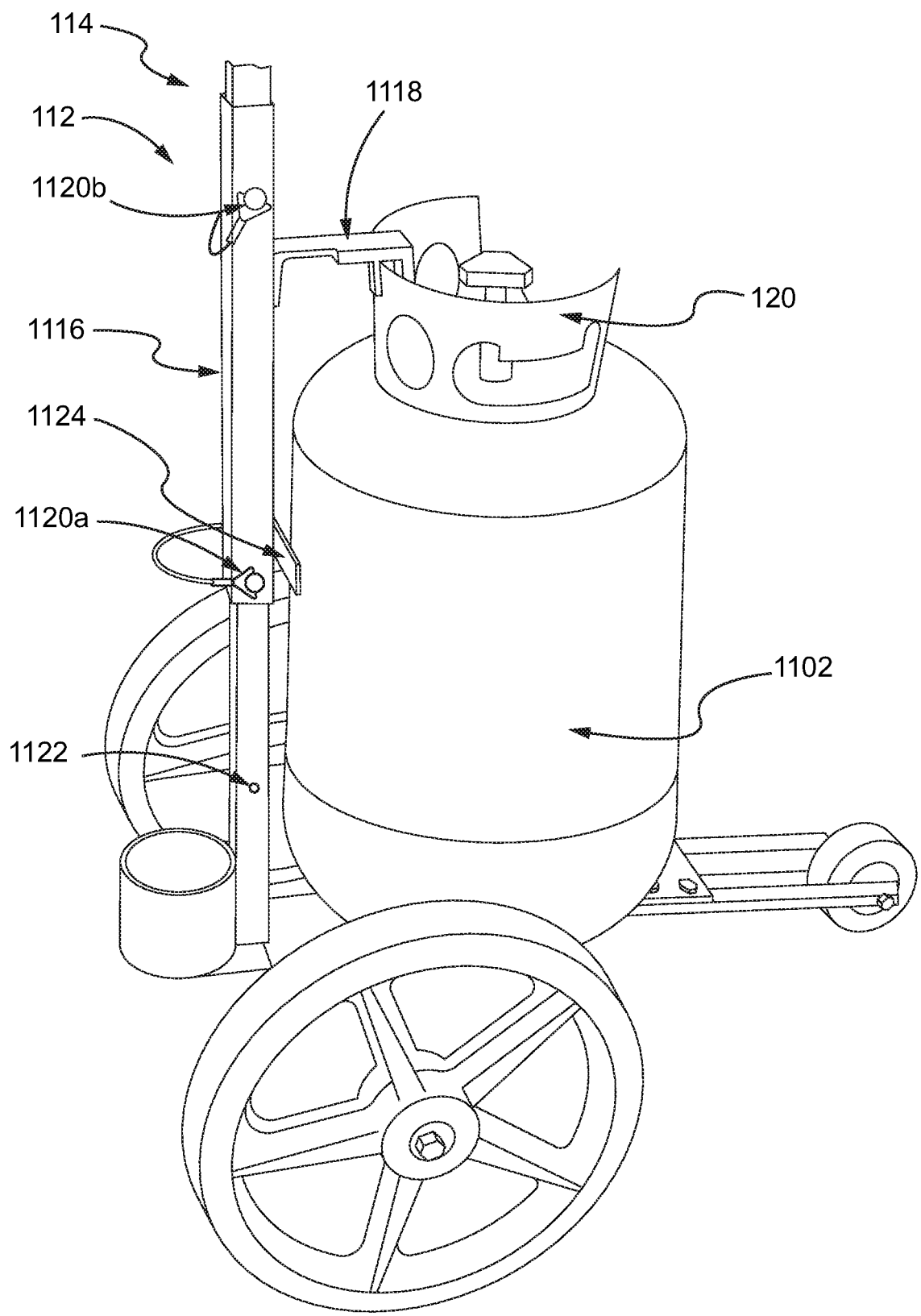
FIG. 11 illustrates a view of an example cart holding a second sized tank, in accordance with aspects of the present invention.

FIG. 11 illustrates cart 100 having a larger tank 1102 than tank 102. Components already described in connection with FIGS. 1-8 are labeled with the same reference numbers. FIG. 11 shows that tank holding mechanism 112 can be set at a variety of heights. In the example in FIG. 11, the tank holding mechanism is positioned at a height further away from the base than it was with smaller tank 102. The tank holding mechanism 112 comprises moveable portion 1116 from which extension 1118 extends, ending in the U-shaped component that securely holds the handle 120 of tank 1102. The moveable portion 1116 comprises a component that at least partially surrounds the handle 114 and moves slidably relative to the handle 114. In FIG. 11, the moveable portion is longer than the version in FIGS. 9 and 10, and comprises openings configured to receive two pins 1120a, 1120b. FIG. 11 illustrates that additional openings may be formed in handle 114 to allow the moveable portion 1116 of the tank securing mechanism 112 to be set at different heights. For example, opening 1122 is visible in handle 114. This figure is only an example, and any number of openings may be included in the handle 114, e.g., depending on the heights of tanks that are desired to be used with the cart.

FIG. 11 also illustrates a bracing component 1124 extending from or coupled to the tank holding mechanism. The bracing component 1124 may provide additional support to tank 1102 and/or may help to prevent the tank from tipping off from the base.

The handle 114 and/or tank securing mechanism may be removably coupled to the base of the cart. For example, pins 1120a, 1120b may connect and hold not only the moveable portion of the tank securing mechanism 112 but also the handle 114 to the base of the cart. In other examples, the handle and/or tank securing mechanism may be rotatably coupled to the base so that the handle rotates toward the base. This allows the cart to be collapsed into a smaller configuration for shipping or storage.

Figure 12A:
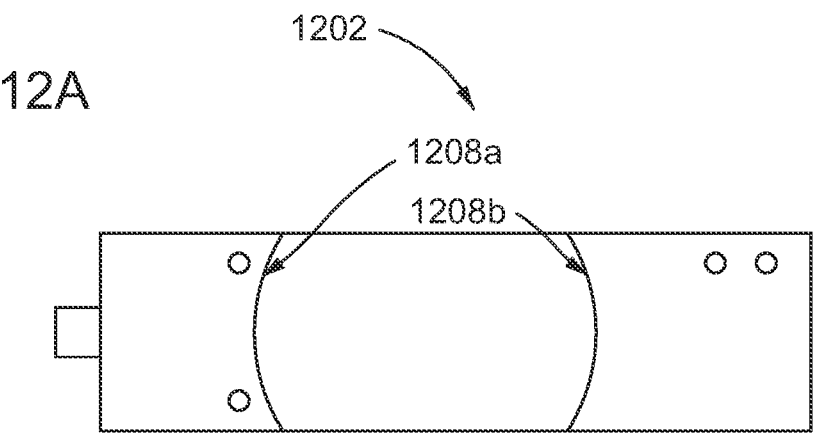
FIGS. 12A and 12B illustrate example aspects of a base of a cart in accordance with aspects of the present invention.
Figure 12B:
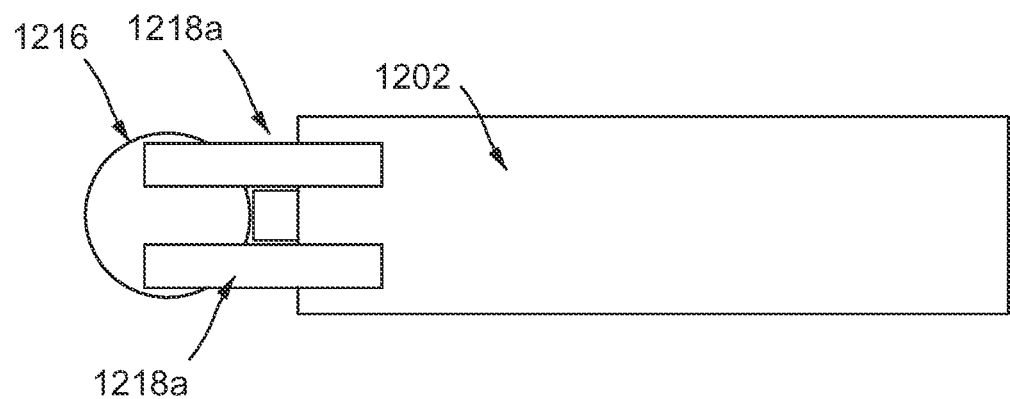

FIGS. 12A and 12B illustrate example drawings of a base 1202, similar to base 202, and providing an example of possible dimensions. Base portion 1202 of a cart may comprise semicircular or bent portions 1208a, 1208b that are configured to fit against a bottom portion of a tank as part of a securing mechanism. FIG. 12A shows a view from the top, e.g., the side of the base 1202 configured to receive the tank. FIG. 12B illustrates a view from the bottom, e.g., the side opposite the side configured to receive the tank. FIG. 12B illustrates accessory holder 1216 and supporting/connecting components 1218a, 1218b.

Figure 13:
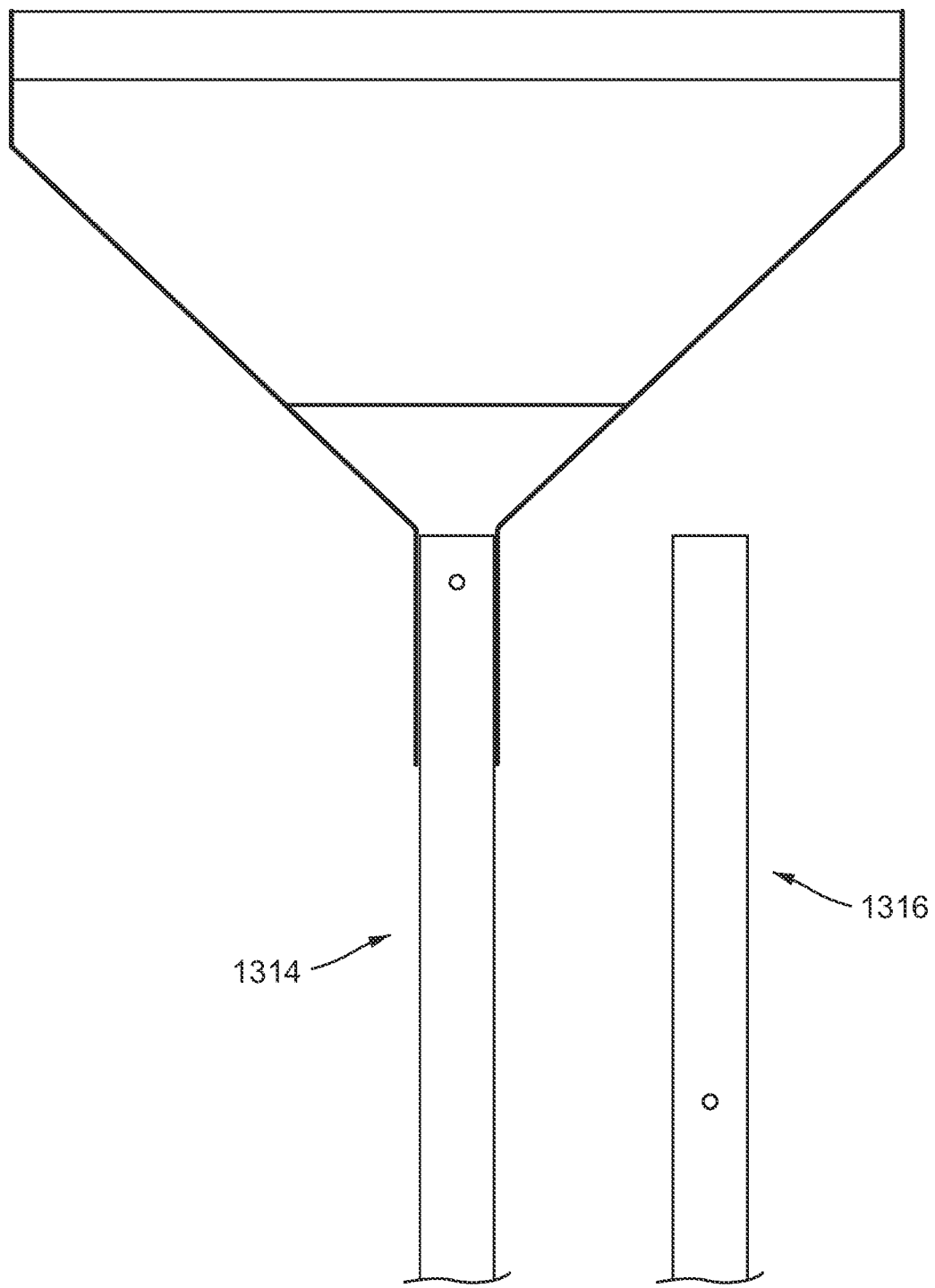
FIG. 13 illustrates example aspects of a handle of a cart in accordance with aspects of the present invention.

FIG. 13 illustrates an example of a handle 1314, similar to handle 114, 104 and 1316 having an example of possible dimensions. Handle 1316 in FIG. 13 is turned 90° relative to the handle 1314 in order to show examples of hole placement for pins.

FIGS. 14A and 14B illustrate different views of a tank holding mechanism 1412, similar to 112 and having an example of possible dimensions. The tank holding mechanism 1412 includes movable portion 1416 similar to 1116 and extension 1418 similar to 1116, as well as the sides 1402, 1404 of U-shaped component that extend on two sides of a tank handle, similar to 802, 804. FIG. 14B illustrates a bracing component 1424 similar to 1124. FIG. 14A illustrates openings 1420a, 1420b configured to receive a pin such as 1120a, 1120b, or other latching component. For example, a spring loaded pin may be positioned within the handle. The pins may be pushed within the handle and in order to adjust the height of the moveable portion 1416.

Figure 15:
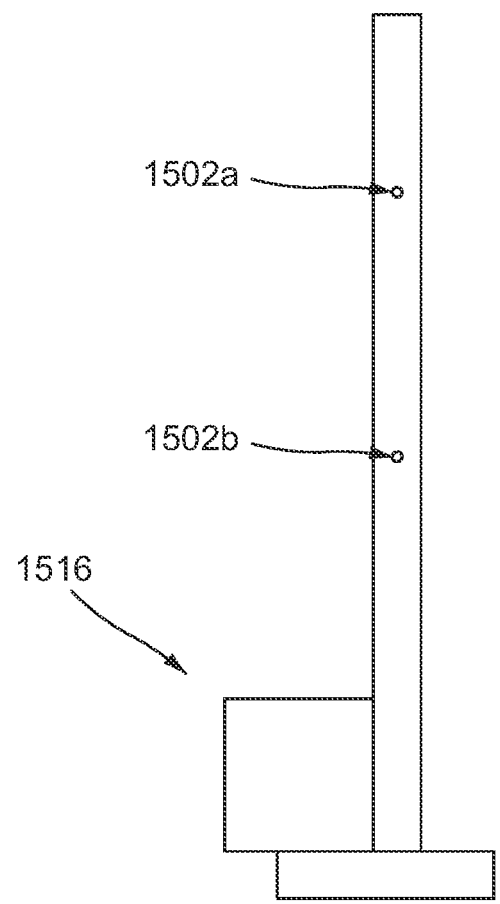
FIG. 15 illustrates example aspects of a base and accessory holder of a cart, in accordance with aspects of the present invention.

FIG. 15 illustrates a side view of the base with the accessory holder 1516, similar to 116, 1216, 1416. Openings 1502a, 1502b are example openings that may be used to adjust the tank holding mechanism, such as 1412, 112, to hold tanks of different sizes, e.g., 20 lb. tank, 30 lb. tank, etc.

Figure 16:
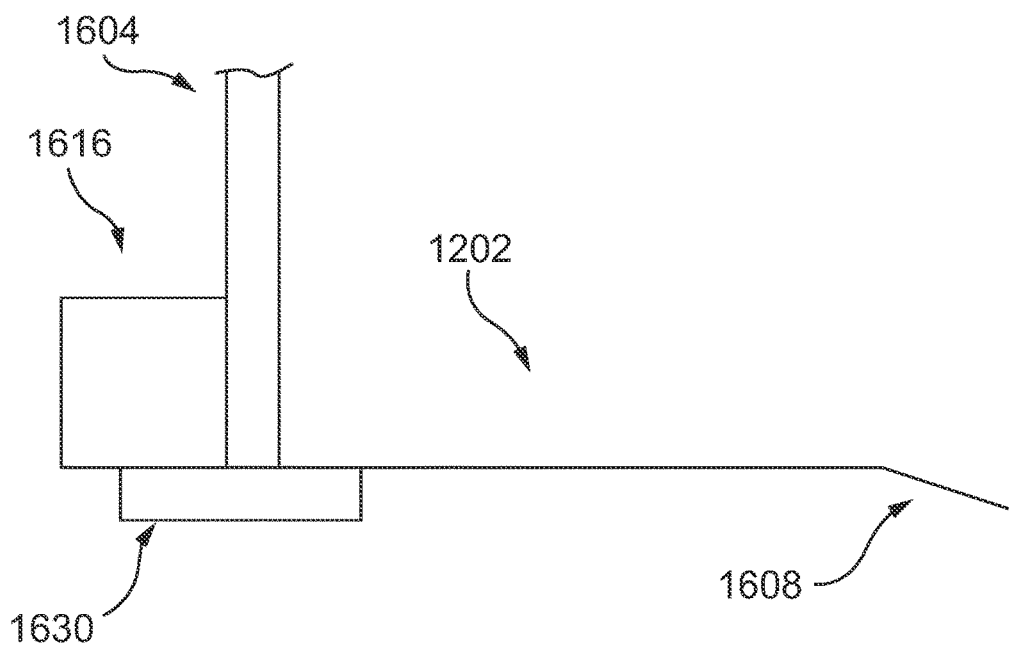
FIG. 16 illustrates example aspects of a base, in accordance with aspects of the present invention.

FIG. 16 illustrates an side view of a portion of an example cart having base 1202 and handle 1604 with an accessory holder 1616. FIG. 16 illustrates an example support piece 1630 under the portion of the cart where the handle 1604 connects to the base 1202. The support piece may also extend under the accessory holder 1616. FIG. 16 illustrates extension 1608 extending from base 1202 at an angle. Examples of a possible set of dimensions are shown for these components of the cart in FIG. 16. Although a wheel is not illustrated in FIG. 16, FIG. 1 illustrates an example wheel 110 at the end of extension 108.

FIGS. 17A, 17B, 17D, 17D illustrate examples of front extension pieces 1708a, 1708b that may be comprised as part of extension 1608, e.g., similar to 108, 908. FIGS. 17A, 17B illustrate a top view of these extension pieces, and FIGS. 17C, 17D illustrate a side view of these extension pieces. Examples of possible dimensions are shown in FIGS. 17A, 17B, 17C, 17D. However, such dimensions are only one example. Other dimensions may also be used. Side views 17C, 17D illustrate example openings 1702a, 1702b that may be used to couple a wheel, e.g., 110, to extension pieces 1708a, 1708b by positioning an axle bolt 400, 900 through openings 1702a, 1702b and the wheel. FIGS. 17A and 17B illustrate openings 1704a-d that may be used to couple the extension 1708 to base, e.g., 202, 1202. Various sizes of axle bolts may be used. In one example, a 7/16 inch bolt may be used. In another example, a 3/8 inch bolt may be used.

Components of the cart, may comprise a metal, such as steel. For example, components, such as a handle 114, may comprise steel pipe. Other components may comprise flat steel pieces or an L-shaped or U-shaped steel piece.

FIG. 18A illustrates top and side views of an example support piece or axle 1830 that may be provided under the main base, e.g., 102, 1202, etc. The support piece 1830 may comprise openings 1832a, 1832b to couple the support piece 1830 to the base.

Pieces, such as 1830, 1708a, 1708b, etc. may be coupled to the base using a bolt, screw, pin, etc. In other examples, the pieces may be welded to base or formed as an integral piece of the base.

FIG. 18B illustrates an example of a handle receiving component 1840. This component 1840 may form an L-shaped extension that extends upward from base, e.g., 102, 1202, etc. to receive handle 104. An opening 1842 may be provided to couple the handle 104 to the base 102, e.g., using bolts, screws, pins, etc. Handle receiving component 1840 may be welded to the base or may be formed as an integral piece with the base.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A mobile gas container cart, comprising:
    a base plate comprising a flat portion for receiving a gas container, wherein a bottom portion of the gas container is positioned on the flat portion of the base plate when the gas container is placed on the base plate;
    a set of wheels coupled via an axle, each wheel of the set of wheels having a diameter of at least twelve inches, wherein the base plate is positioned above the axle;
    a handle extending from a front side of the base plate;
    an extension extending from a back side of the base plate opposite the front side from which the handle extends, wherein the extension comprises a first end extending from the base plate and a second end opposite the first end; and
    a third wheel having an axle positioned at the second end of the extension opposite the base plate, such that the extension extends linearly from the base plate to the third wheel.

2. The cart of claim 1, wherein each wheel of the set of wheels has a diameter within a range of twelve to sixteen inches.

3. The cart of claim 1, wherein each wheel of the set of wheels has a diameter of fourteen inches.

4. The cart of claim 1, wherein the gas container is a 20 pound gas container or a 30 pound gas container, and wherein the base plate is coupled to the axle between the set of wheels such that a first height of a center of gravity of the 20 pound gas container or the 30 pound gas container, when received on the base plate, is located within a second height of the set of wheels having the diameter of at least twelve inches.

5. The cart of claim 1, wherein the third wheel comprises a diameter of less than 5 inches.

6. The cart of claim 5, wherein a ratio of a diameter of the wheels in the set of wheels to the diameter of the third wheel is within the range of 8:1 to 2:1.

7. The cart of claim 5, wherein the ratio is 7:2.

8. The cart of claim 1, wherein the base plate comprises a gas container securing mechanism.

9. The cart of claim 8, wherein the gas container securing mechanism comprises an extension for extending upward against a bottom of the gas container, when the gas container is placed on the base plate.

10. The cart of claim 9, wherein the extension comprises at least one semicircular component extending from the base plate and fitting within an inner perimeter of a circular indentation on the bottom of the gas container, when the gas container is placed on the base plate.

11. The cart of claim 1, further comprising a holding mechanism that is adjustable to hold gas containers at different heights to the cart.

12. The cart of claim 11, wherein the holding mechanism extends from the handle to secure gas containers at a plurality of heights along the handle.

13. The cart of claim 12, wherein the holding mechanism comprises a semi-circular shaped piece that movably slides within a portion of a handle of the gas container, when the gas container is placed on the base plate.

14. The cart of claim 12, wherein the holding mechanism comprises a u-shaped extension shaped to slide down the handle to fit around a portion of a top of a handle of the gas container, when the gas container is placed on the base plate.

15. The cart of claim 1, further comprising:
    an accessory holder coupled to the base plate.

16. The cart of claim 15, wherein the accessory holder comprises at least one of cylindrical container sized to receive at least a portion off the accessory and a rod extending from the base plate.

17. The cart of claim 15, further comprising an accessory holding component for holding a second portion of the accessory to the handle, wherein the accessory holding component comprises a releasable latch that receives a hose from the accessory.

18. The cart of claim 1, wherein the extension extends from the base plate at an angle to the flat portion of the base plate.

19. The cart of claim 1, further comprising:
    at least one semicircular component extending from the base plate and fitting within an inner perimeter of a circular indentation on the bottom of the gas container, when the gas container is placed on the base plate; and
    a holding mechanism that slides relative to a handle to slide into a first position in which the holding mechanism fits against a portion of the handle of the gas container and into a second position to release the handle of the gas container.

20. The cart of claim 1, wherein the extension comprises two extension pieces extending between the base plate and the third wheel, wherein the two extension pieces are spaced apart by the third wheel, and
    wherein the third wheel has an axle coupled at the end between the two extension pieces.

* * * * *